(12) United States Patent
Slupik et al.

(10) Patent No.: US 9,921,557 B2
(45) Date of Patent: Mar. 20, 2018

(54) AUTOMATION SYSTEM COMPRISING A MONITORING DEVICE AND METHODS THEREFOR

(71) Applicant: Silvair Sp. z o.o., Cracow (PL)

(72) Inventors: Szymon Slupik, Cracow (PL); Adam Gembala, Cracow (PL); Maciej Witalinski, Jaworzno (PL)

(73) Assignee: Silvair Sp. z o.o., Cracow (PL)

( * ) Notice: Subject to any disclaimer, the term of this patent is extended or adjusted under 35 U.S.C. 154(b) by 624 days.

(21) Appl. No.: 14/456,552

(22) Filed: Aug. 11, 2014

(65) Prior Publication Data

US 2015/0200787 A1 Jul. 16, 2015

Related U.S. Application Data

(60) Provisional application No. 61/927,864, filed on Jan. 15, 2014.

(51) Int. Cl.
| | |
|---|---|
| *G05B 15/02* | (2006.01) |
| *G05D 23/19* | (2006.01) |
| *G05D 25/00* | (2006.01) |
| *H04L 12/28* | (2006.01) |
| *G08C 23/04* | (2006.01) |
| *H04Q 9/00* | (2006.01) |

(52) U.S. Cl.
CPC ............ *G05B 15/02* (2013.01); *G05D 23/19* (2013.01); *G05D 23/1919* (2013.01); *G05D 25/00* (2013.01); *G08C 23/04* (2013.01); *H04L 12/2827* (2013.01); *H04Q 9/00* (2013.01); *G05B 2219/163* (2013.01); *G05B 2219/25011* (2013.01); *G05B 2219/2614* (2013.01); *G05B 2219/2642* (2013.01); *H04Q 2209/43* (2013.01)

(58) Field of Classification Search
None
See application file for complete search history.

(56) References Cited

U.S. PATENT DOCUMENTS

| 5,923,035 A | 7/1999 | Winkler et al. |
| 2003/0080296 A1 | 5/2003 | Raper et al. |
| 2012/0007555 A1 | 1/2012 | Bukow |

(Continued)

FOREIGN PATENT DOCUMENTS

EP  2362582 A1  8/2015

OTHER PUBLICATIONS

"International Search Report and the Written Opinion" dated Sep. 24, 2015, issued in related International Application No. PCT/IB2015/000528, Publisher: PCT, Published in: EP.

(Continued)

*Primary Examiner* — Qing Wu
(74) *Attorney, Agent, or Firm* — McGeary Cukor LLC; Kenneth Ottesen; Jason Paul DeMont

(57) ABSTRACT

A monitoring device for use in an automation system, such as for a home, warehouse, or any type of structure. The monitoring device includes sensors, a processor, and a transmitter. Using its sensors, the monitoring device is capable of acquiring data about itself and/or its environment. That data is used by the monitoring device and/or a central controller to generate a request for an actor, such as lighting, an HVAC system, motorized drapes, a home entertainment system, other home systems, or appliances, to change its state.

29 Claims, 13 Drawing Sheets

(56) References Cited

U.S. PATENT DOCUMENTS

| | | |
|---|---|---|
| 2012/0136666 A1 | 5/2012 | Corpier et al. |
| 2012/0154126 A1 | 6/2012 | Cohn et al. |
| 2013/0241313 A1 | 9/2013 | Chirgwin |
| 2014/0005809 A1 | 1/2014 | Frei et al. |
| 2014/0016527 A1 | 1/2014 | Coffey |
| 2014/0084165 A1 | 3/2014 | Fadell |
| 2014/0266669 A1* | 9/2014 | Fadell ................. G05B 19/042 340/501 |

OTHER PUBLICATIONS

International Search Report, PCT/US2015/059295.
Written Opinion of the International Searching Authority, PCT/US2015/059295.
International Preliminary Report on Patentability, PCT/US2015/059295.

* cited by examiner

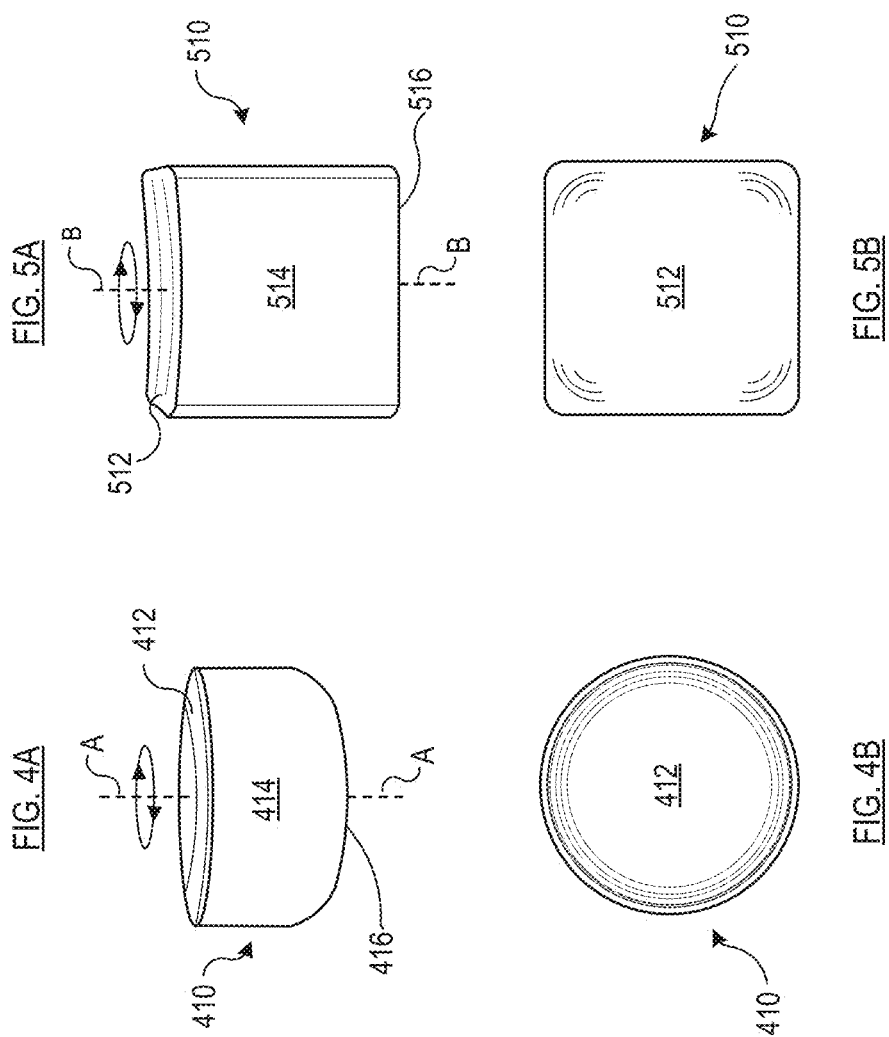

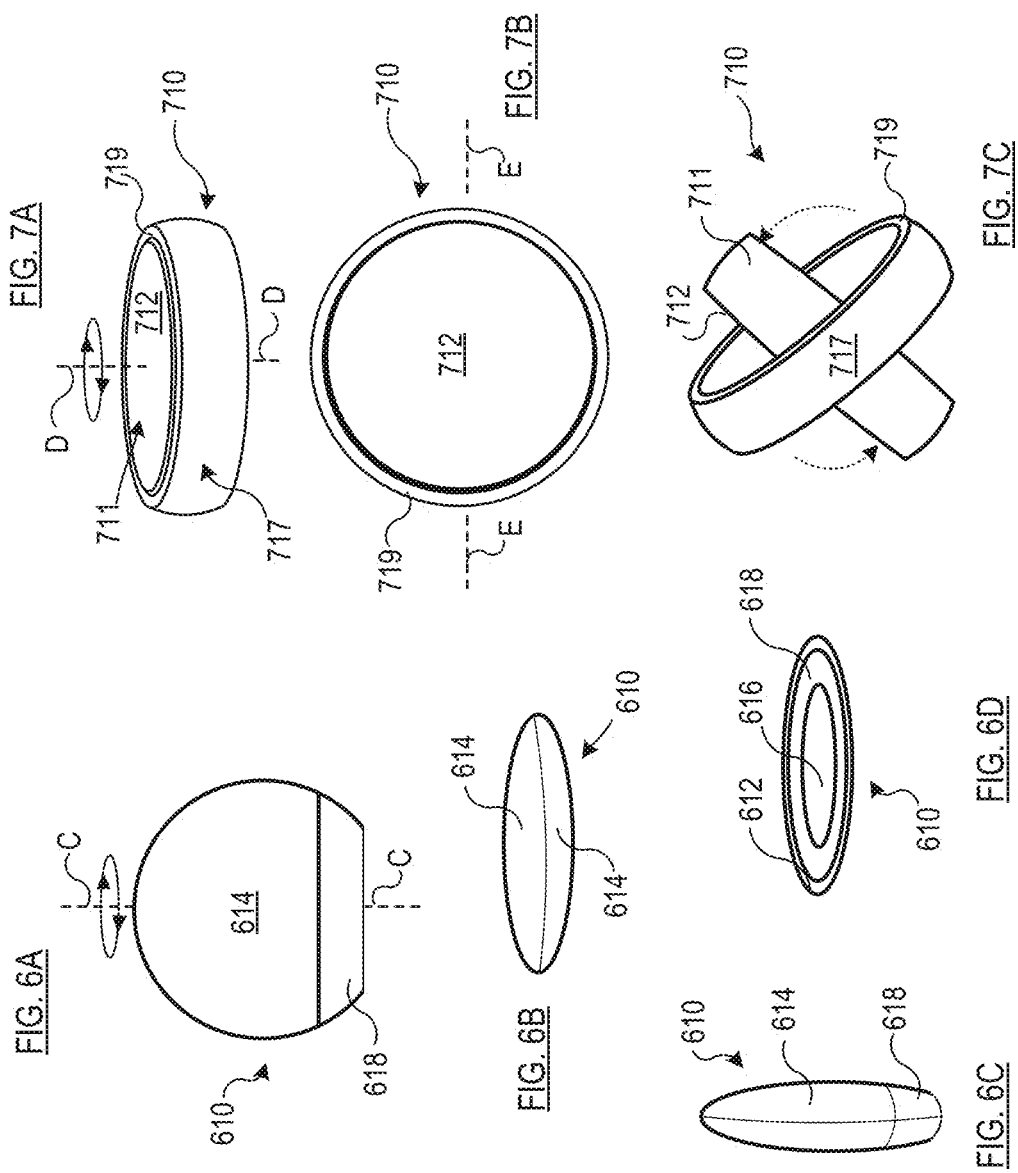

Monitoring Device 102/202/302

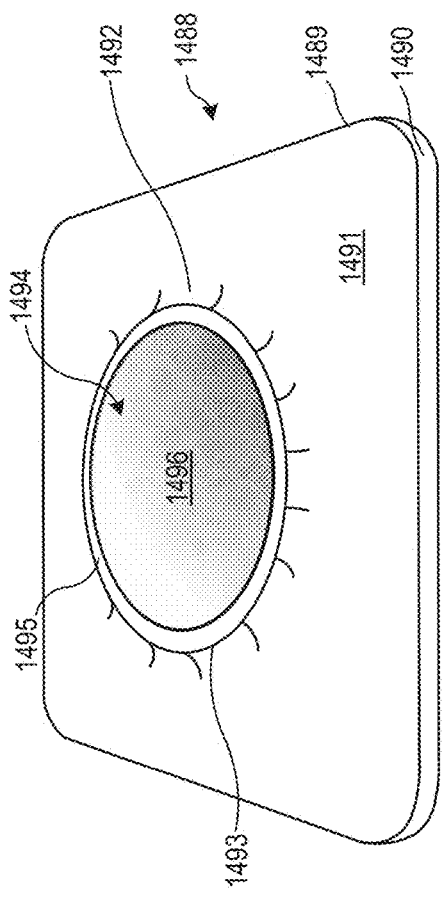
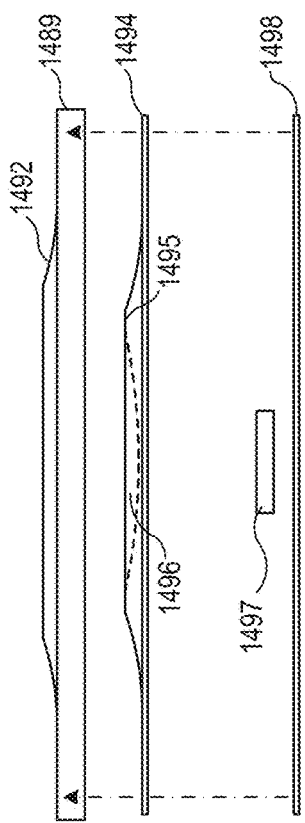
FIG. 14A
FIG. 14B

AUTOMATION SYSTEM COMPRISING A MONITORING DEVICE AND METHODS THEREFOR

STATEMENT OF RELATED CASES

This case claims priority of U.S. Patent Application U.S. 61/927,864 filed Jan. 15, 2014, which is incorporated herein by reference.

BACKGROUND OF THE INVENTION

Home automation refers to the use of computer and information technology to control home systems, such as lighting, HVAC, audio-visual, smoke detection, security, and shading, among others. Using specialized hardware, even household appliances can be monitored and controlled automatically. A feature of science fiction for many years, home automation has only recently become practical, both from a technological and cost perspective. This is due to the rapid advancement of information technology.

A sophisticated home automation system may include sensors (e.g., temperature, light, motion detection, etc.), controllers (e.g., a general-purpose personal computer or a dedicated automation controller, etc.), and actuators (e.g., motorized valves, switches, etc.). The system also includes a human-machine interface device that enables a resident of the home to interact with the system. The interface can be a specialized terminal or an application ("app") running on a smart phone or tablet computer. The various system devices communicate over dedicated wiring, or over a wired network, or wirelessly, using one or more protocols.

The sensors that are present in a home automation system typically include one or more of: motion sensors, temperature sensors, light sensors, and air quality sensors. Using such sensors, a home automation system is capable of triggering certain events as a function of sensor readings, such as turning on lights when motion is detected or when ambient light is low, controlling HVAC systems in response to temperature variations, and so forth.

Sensors can be packaged in a housing having a relatively small form factor and can be mounted in various ways (e.g., magnetically, via suction cup, via double-sided tape, etc.). Also, multiple sensors can be packaged together in one unit.

SUMMARY OF THE INVENTION

The present invention provides a monitoring device (hereinafter "MD") that is particularly well adapted for use in a home automation system. The illustrative embodiment of the invention is a home automation system including at least one MD.

The MD is a device that includes sensors, a processor, and a transmitter. Via the sensors, the MD is capable of acquiring data about itself and/or its environment.

The data, whether pertaining to the MD itself or its environment, relates more or less directly to a decision to change a state of a particular actor. The term "actor" refers to a device or system that can affect its environment and whose state or operation can be changed, wherein the results of the change are predictable. A non-exclusive list of actors relevant to a home automation system include lighting, HVAC, window shades, a home entertainment system, door locks, smart appliances, and the like.

Using the processor and transmitter, the MD is capable of generating and transmitting a signal containing information related to the acquired sensor data. In various embodiments, the signal is transmitted to a system controller, directly to an actor, or to the Cloud (e.g., to a computer that performs at least some of the functions of the system controller and that is accessible via, for example, the Internet, etc.).

By way of illustration but not limitation, the MD can transmit a signal that ultimately results in the dimming of room lighting, or in altering the temperature set-point of an HVAC system, or the lowering of a window shade, or an increase in the loudness of a television, or turning off a stereo system. Of course, to implement any requested change-in-state in automated fashion, the actor must be "smart;" that is, they must possess or be operatively coupled to appropriate hardware (e.g., telecommunications receiver, processor, actuator, etc.) And software (e.g., for interpreting a request/command, generating a control signal for the actuator, etc.). It is to be understood that any actors used in conjunction with an MD and an automation system including same, include the aforementioned appropriate hardware/software.

As previously mentioned, the MD includes some sensors that are capable of monitoring the MD itself; that is, monitoring a state of the MD. More particularly, the inventors recognized that incorporating sensors in the MD that are capable of monitoring angular rotation and spatial orientation thereof would enable the MD to be used as a "spindleless" knob, reacting to tilts, turns, and all sorts of gestures, without the presence of a physical linkage between the knob and any type of electrical contact. This enables the MD to function as a hand-held, free-space, gesture controller. As such, the MD can affect the operation of an actor even though it is not electrically or physically connected to it.

In a further insight, the inventors recognized that the open architecture enabled by "untethering" the MD could provide substantial flexibility to a home automation system and potentially support a number of capabilities that would not otherwise be possible or practical. Stated differently, a key aspect of the MD is that its functions are not defined at the moment it is manufactured. At the time of manufacture, the MD is "abstract" or "generic". It becomes concrete when configured for use; that is, the MD's functions are defined when a user or system installer decides on a specific context for its use.

In some embodiments, the MD includes:
  (i) at least one device capable of sensing/measuring/determining one or more states of the MD itself, as affected by a user's interaction therewith, and
  (ii) telecommunications capability for transmitting a message that contains information related to the MD's state(s) or a desired/requested state change for an actor based thereon.

The states measured by the device(s) can be, without limitation, the MD's (a) angular rotation, and/or (b) orientation in space, and/or (c) position/location. The state(s) can be used for a variety of purposes, such as, without limitation:
  (i) provide a quantification of a desired change in state (e.g., an amount/degree of change); and/or
  (ii) determine the MD's functionality with respect to a particular actor (e.g., to alter color, to function as a dimmer switch, etc.);
  (iii) determine which particular actor the MD's information is intended for (i.e., define an association between an MD and a particular actor).

In some further embodiments, the MD includes:
  (i) at least one device capable of sensing/measuring/determining ambient conditions or other factors unrelated to the MD itself that are directly or indirectly relevant to a decision to change a state of an actor; and (ii) telecommunications capability for transmitting a message that contains information pertaining to the ambient conditions or to a desired/requested state change for an actor based thereon.

In yet some further embodiments, the MD includes:
(i) at least one device capable of sensing/measuring/determining one or more states of the MD itself, as affected by a user's interaction therewith, and
(ii) at least one device capable of sensing/measuring/determining ambient conditions or other factors unrelated to the MD itself that are directly or indirectly relevant to a decision to change a state of an actor; and
(iii) telecommunications capability for transmitting a message that reports at least one of a) information related to the MD's state(s) or a desired/requested state change for an actor based thereon, and b) information pertaining to the ambient conditions or to a desired/requested state change for an actor based thereon.

In some further embodiments, any of the previously described embodiments also incorporate the capability to receive data from external sensors and report such data or information based thereon, or "fuse" such data with data obtained via the MD's sensors and determine a desired/requested state change for an actor based thereon.

As will be appreciated from the foregoing, the MD accesses two types or "channels" (logical) of information—primary and secondary—that are more or less relevant to a decision whether to change a state of a particular actor. The terms "primary information," "primary channel," and "primary-channel information" are used synonymously herein as are the terms "secondary information," "secondary channel," and "secondary-channel information."

Primary-channel information pertains to a state of the MD itself; that is, as previously disclosed, the MD's angular rotation, orientation in space, or location/position. The significance of such movement was previously mentioned. For example, movement (e.g., rotation, etc.) of the MD about certain predefined axes thereof, as effected by a user, can provide information relevant to the MD's functionality, the amount/degree of a desired change in state, and/or the actor to which the state change is intended to apply. Orientation/rotation can be determined, for example, by an on-board gyroscope and accelerometer (the use of the accelerometer in conjunction with the gyroscope increases the accuracy of any such measurements). Furthermore, the location of the MD with respect to other elements of the home automation system can provide information relevant, for example, to the MD's functionality and/or the actor to which a change in state is intended to apply.

Secondary-channel information pertains to any condition external to the MD that can be sensed by the MD and that is directly or indirectly relevant to whether a state change of an actor is desired. Secondary-channel information pertains, for example, to ambient environmental conditions (e.g., air quality, humidity, temperature, light levels, noise levels, etc.) or other factors, such as the time-of-day, the particular user that is handling the MD, and so forth. Such information can be sensed/determined directly by "on-board" sensors/devices or by sensors/devices external to the MD that transmit to the MD, the system controller, or to the Cloud.

The MD is capable of working autonomously via secondary information; that is, by sensing ambient conditions via its captive sensors or external sensors. In other words, the primary-channel information, which typically relates to user interaction with the MD, is not required. Alternatively, the MD is capable of working via primary-channel information without secondary-channel information.

As previously noted, in some embodiments, the MD interacts with a system controller while in other embodiments communication is between the MD and the actor (i.e., peer-to-peer). In either situation, a signal containing information pertaining to the primary and/or secondary information is received by the associated actor(s). More particularly, in some embodiments, a request to change a state of the actor is received by a communications component associated with the actor. The request is then transmitted to a processor that is operatively coupled to an actuator that actuates the actor. The processor generates a control signal that is transmitted to the actuator, which then effectuates the desired change of state in the actor.

In some embodiments in which the MD operates peer-to-peer, some or all of the functionality that would otherwise be part of the system controller is distributed among other elements (e.g., one or more MDs, one or more actors, etc.) that constitute the automation system and may even be distributed in part or whole to the "Cloud".

The information contained in the request/report from the MD may vary as a function of:
(1) whether the MD reports to a system controller or directly to the actor; and/or
(2) the precise location of the "distributed" intelligence (e.g., what processing is performed in the MD versus what processing is performed in the components associated with the actor, etc.).

In some embodiments, the MD includes a battery and the automation system dynamically manages its power consumption using information from plural sensors, either embedded in one or more MDs or external thereto. The information from the sensors is processed via a multi-conditional algorithm that makes decisions as to the power state (i.e., on, off, stand-by) of each of the components in the automation system (e.g., MDs, sensors within the MDs, communications modules, the system controller, etc.).

The MD can be implemented in a variety of form factors. For example, the MD can have, without limitation, a polygonal form (e.g., cubic, etc.), a cylindrical form, a hemispherical form, a parabolic form, or a random/arbitrary/non-specific form. In the illustrative embodiment, the MD is small, having a typical maximum dimension of about 3.5 to about 4 centimeters, enabling it to be easily handled and readily manipulated (e.g., rotated, etc.) by a user.

In some embodiments, information from more than one MD is used as the basis for state-change decision-making with respect to an actor. For example, in some embodiments, two or more MDs report to a system controller that, based on a sensor-fusion algorithm, directs a change in one or more actors.

In an embodiment of the present invention, an automation system comprises a plurality of MDs, a system controller, and smart actors that are packaged as a kit, wherein the system is commissioned via machine-readable codes (e.g., data matrix codes, etc.).

BRIEF DESCRIPTION OF THE DRAWINGS

FIGS. 4A-4B depict respective perspective and top views of a first form-factor for an MD in accordance with an illustrative embodiment of the present invention.

FIGS. 5A-5B depict respective perspective and top views of a second form-factor for an MD in accordance with an illustrative embodiment of the present invention.

FIGS. 6A-6D depict views of a third form factor for an MD in accordance with an illustrative embodiment of the present invention.

FIGS. 7A-7C depict views of a fourth form factor for an MD in accordance with an illustrative embodiment of the present invention.

FIGS. 14A-14B depict respective perspective and exploded side views of a first embodiment of a base for an MD in accordance with an illustrative embodiment of the present invention.

DETAILED DESCRIPTION

The illustrative embodiment of the invention pertains to a home automation system. But as those who are skilled in the art will appreciate, the automation systems and components disclosed herein can be applied to any type of building or environment that can benefit from automated control.

Definitions. The following terms and phrases, and inflected forms thereof, are defined for use in this disclosure and the appended claims:

"actor" refers to a device or system that can affect its environment and whose state or operation can be changed, wherein the results of the change are predictable. A non-exclusive list of actors relevant to a home automation system include lighting, HVAC, window shades, a home entertainment system, door locks, smart appliances, and the like. To implement a change-in-state in automated fashion, the actor must possess or be operatively coupled to appropriate hardware (e.g., telecommunications receiver, processor, actuator, etc.) And software (e.g., for interpreting a request/command, generating a control signal for the actuator, etc.). Any actor used in conjunction with a monitoring device and an automation system in accordance with the present teachings includes the aforementioned appropriate hardware/software.

"association" when used to refer to a relationship between a monitoring device and an actor, means that the reports or requests that the monitoring device issues are intended for the "associated" actor.

"ambient conditions" when used in reference to the monitoring device, means any physical condition of the monitoring device's ambient environment, such as temperature, air quality, time, etc.

Figure 1:
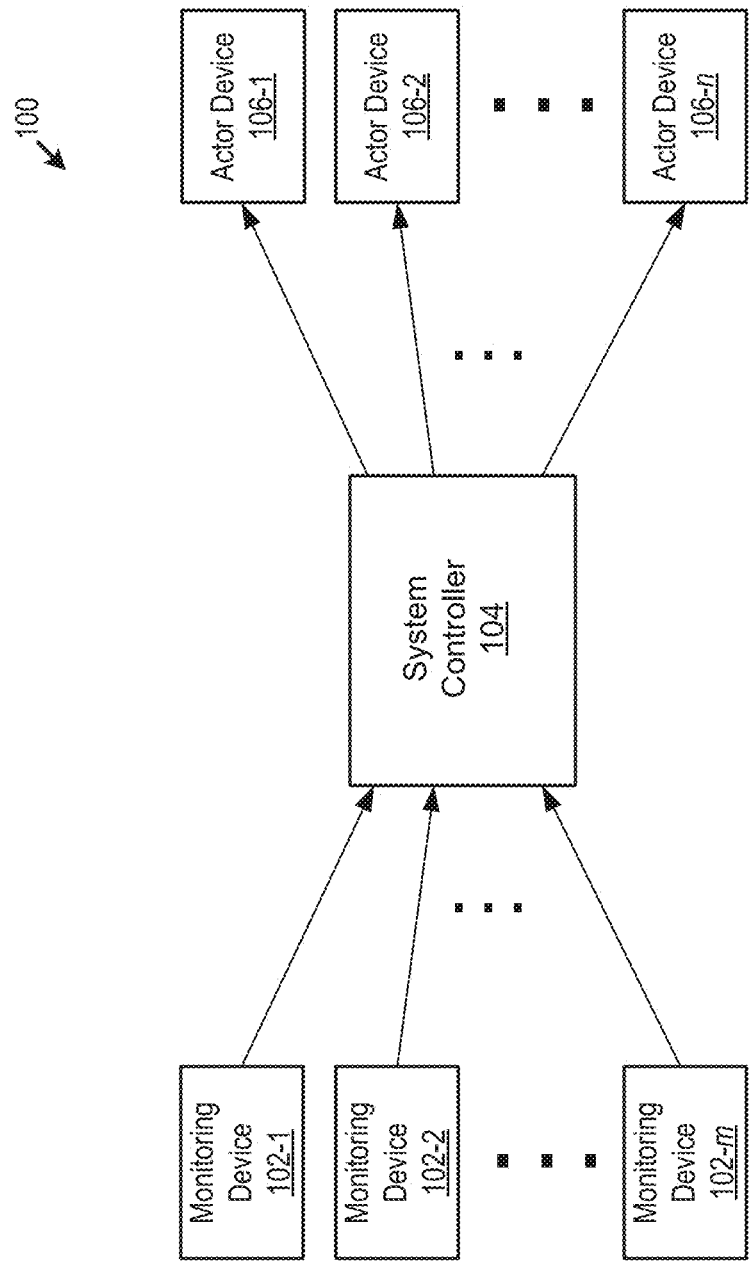
FIG. 1 depicts automation-system 100 in accordance with an illustrative embodiment of the present invention.
Figure 2:
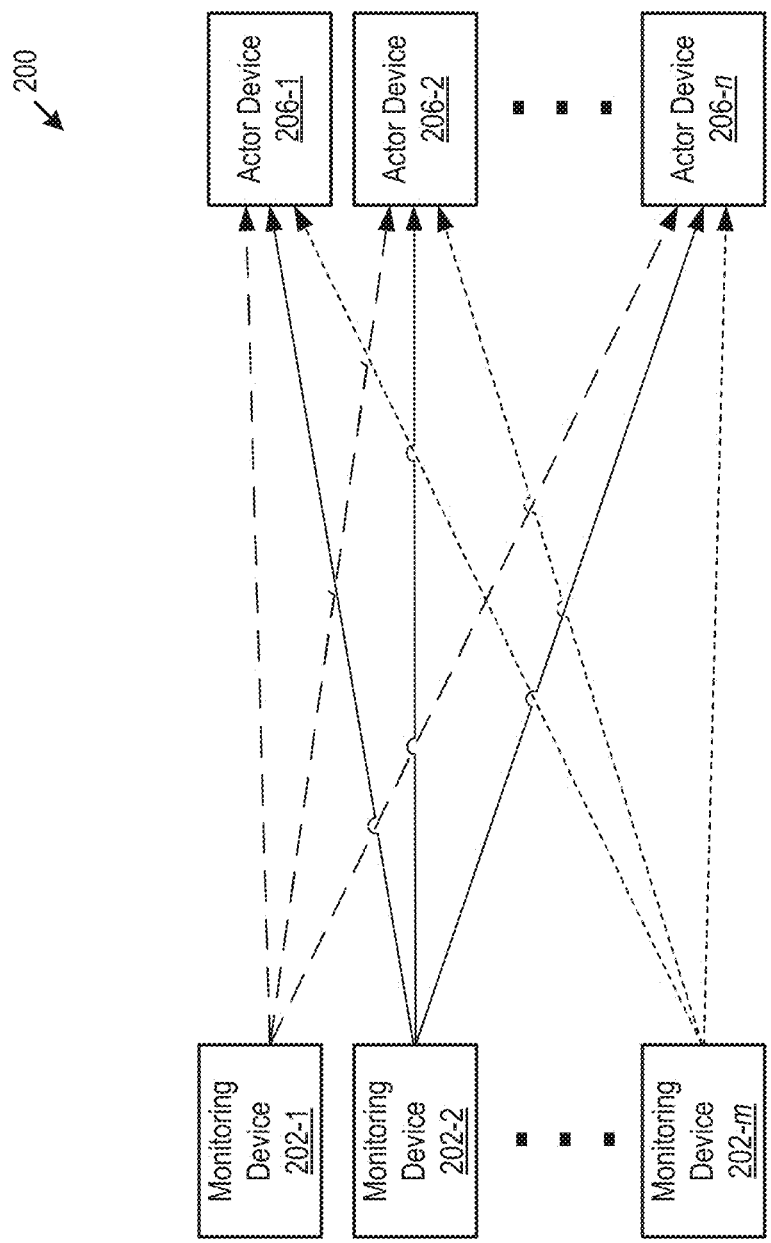
FIG. 2 depicts automation-system 200 in accordance with an illustrative embodiment of the present invention.
Figure 3:
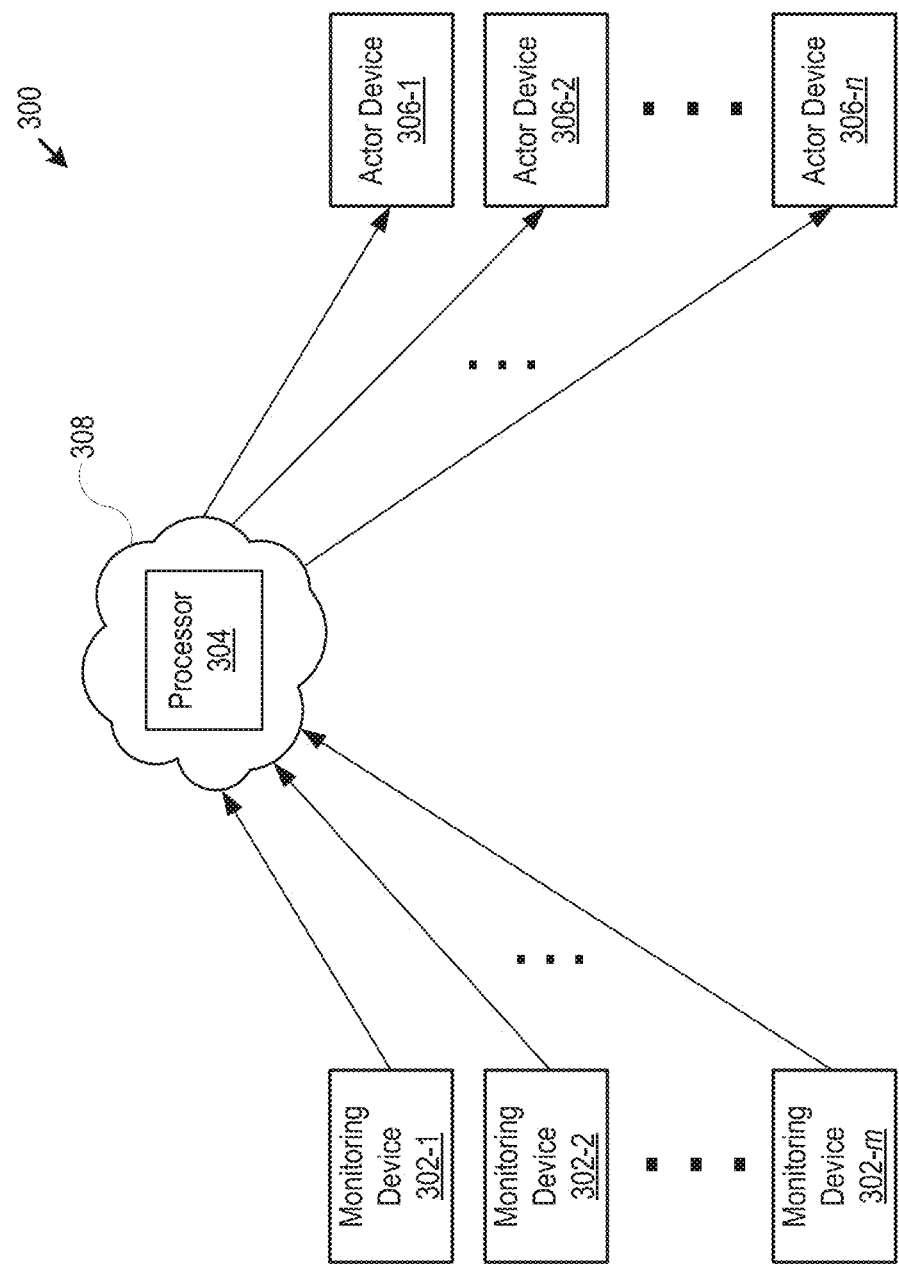
FIG. 3 depicts automation-system 300 in accordance with an illustrative embodiment of the present invention.

FIGS. 1 through 3 depict three versions of automation systems in accordance with the present teachings.

FIG. 1 depicts system 100, which comprises monitoring devices ("MD") 102-i, where i is a positive integer from 1 to M, system controller 104, and actor devices ("actors") 106-i, where i is a positive integer from 1 to N. The aforementioned elements are interrelated as shown.

MD 102-i (hereinafter generically "MD 102") is an apparatus that is capable of obtaining data about itself (i.e., primary information) or about conditions in its ambient environment (i.e., secondary information) and reporting the data or information related thereto. As described more fully later in conjunction with FIGS. 8 through 11, MD 102 obtains the information primarily from one or more on-board sensors.

MD 102 is also capable of receiving, via its communications capabilities, information from external sensors, such as those associated with an actor, other MDs, or other sensor-bearing devices. In such situations, MD 102 can access information pertaining to conditions prevailing beyond its local surroundings. In some embodiments, information obtained from external sensors is transmitted to system controller 104.

The information obtained by MD 102 is used to request a change of state in actor 106-i (hereinafter generically "actor 106") or report information relevant to determining whether such a change is necessary or otherwise desirable. In some embodiments, MD 102 performs relatively minimal processing of the data obtained by the sensors (i.e., performs processing sufficient to simply transmit raw data). In some other embodiments, MD 102 performs relatively more extensive processing of the raw sensor data. For example, in some such embodiments, MD 102 fuses data from multiple on-board sensors and reports information pertaining the results of the fusion, and/or evaluates secondary data (e.g., ambient conditions, etc.) And determines a desired/required change of state based thereon, etc.

In the illustrative embodiment depicted in FIG. 1, the request/report from MD 102 is transmitted to system controller 104. System controller 104 is a data processing apparatus having wireless and wired telecommunications capabilities, including a variety of input/output ports (e.g., Ethernet, etc.).

In automation system 100, system controller 104 functions as an intermediary between the MDs 102 and actors 106, coordinating the actions to be taken by the actors based on:
  i) the signals received from one or more MDs 102, and
  ii) one or more memorized states of at least one processing event.

Thus, system controller 104 receives primary and/or second information from MDs 102, and, in some embodiments, information about the state of actors 106 (when the actors are appropriately configured to obtain and transmit such information). The system controller also maintains in memory the states of various processing events (e.g., predetermined sequences of various input signal values, the time since a last instance of a predetermined input signal value was received, other events that reflect changes in states reported by MDs 102, etc.).

Figure 12:
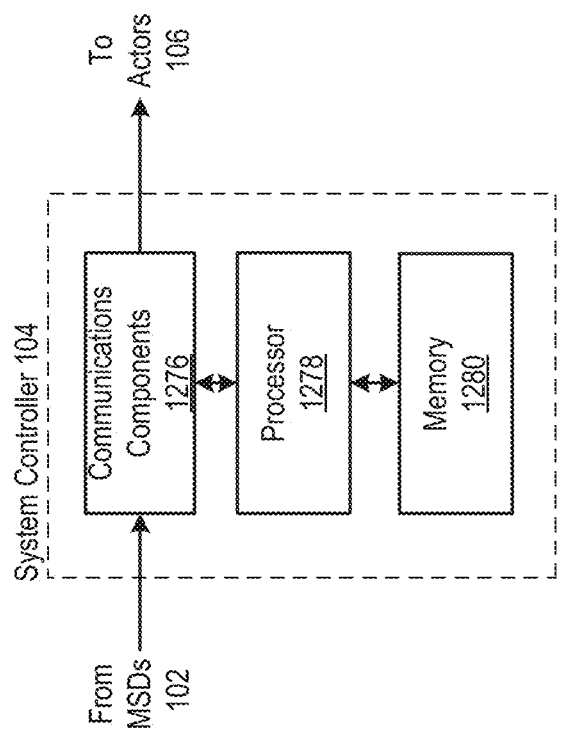
FIG. 12 depicts a system controller for use in conjunction with automation systems 100, 200, 300.

FIG. 12 depicts an illustrative hardware platform of system controller 104, which includes: communications components 1276 for providing wireless and/or wired communications, processor 1278, and memory 1280.

Communications component 1276 is configured to telecommunicate with each MD 102 and each actor 106, in well-known fashion. Communications component 1276 communicates via one or more telecommunications protocols such as, but not limited to, Z-Wave, ZigBee, Bluetooth, Wi-Fi, 6LoWPAN, and so on. In some embodiments, communications component 1276 includes a built-in Bluetooth Smart radio transceiver. In light of the present disclosure, it will be clear to those skilled in the art how to make use various other embodiments of the present invention in which system controller 104 communicates via a wired protocol (e.g., X10, KNX, etc.) over physical media (e.g., cable, wire, etc.) with one or more external devices, either in addition to or instead of the wireless capability provided by communications component 1276.

Processor 1278 is a processing device, such as a microprocessor as is well known in the art. The processor is configured such that, when operating in conjunction with the other components of system controller 104, it executes software, processes data, and telecommunicates with MDs 102 and actors 106 in addition to any other components of automation system 100. Processor 1078 is configured to handle both:
  i. combinatorial logic, whose output is a function of only the present input (e.g., input signal values from MDs 102, etc.), and
  ii. sequential logic, whose output depends also on the past history of the inputs.

In handling sequential logic, processor 1278 stores into memory 1280 certain events, states, results, and so on, for future use. In doing so, the processor maintains one or more memorized states of processing events, including the points in time when they occurred.

Because processor 1278 handles both kinds of logic, the decision logic of the illustrative embodiment is based not only on real-time input information from MDs 102 (i.e., related to combinational logic) but also on some memorized state of the logic (i.e., related to sequential logic). The memorized state comprises information on processing events that occurred in the past and, at least for some events, the times at which they occurred.

Memory 1280 is non-transitory and non-volatile computer storage memory technology that is well known in the art (e.g., flash memory, etc.). Memory 1280 is configured to store an operating system, application software, and a database. The database comprises information about MD 102, each actor 106, and the relationships therebetween; environmental information; values of one or more building states; values of one or more activities occurring at a building; and so on. The operating system is a collection of software that manages, in well-known fashion, the system controller's hardware resources and provides common services for computer programs, such as those that constitute the application software. In accordance with an illustrative embodiment, operating system is Linux-based; in some alternative embodiments, however, the operating system is based on a different platform. The application software that is executed by processor 1278 according to the illustrative embodiment enables system controller 104 to process the information received from MDs 102 in conjunction with past states and events.

It will be clear to those skilled in the art, after reading the present disclosure, that in some alternative embodiments the hardware platform of system controller 104 can be embodied as a multi-processor platform, as a sub-component of a larger computing platform, as a virtual computing element, or in some other computing environment—all within the scope of the present invention. Further detail of system controller 104 and its operation in an automation system is provided in co-pending patent application Ser. No. 14/195, 941 entitled "Automation and Control System with Context Awareness," which is incorporated by reference herein.

Returning now to the discussion of FIG. 1, actor 106 is an apparatus that takes certain actions based on signals originating from one or more MDs 102, as processed by system controller 104 (at least in the embodiment of FIG. 1).

Figure 13:
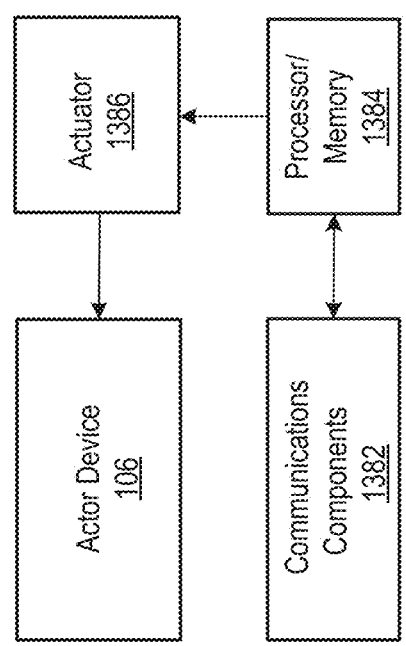
FIG. 13 depicts an actor device and associated components.

With reference to FIG. 13, actor 106 is operatively coupled to communications components 1382, processor/memory 1384, and actuator 1386. In operation, communications components 1382 receive a message (i.e., from system controller 104 in the embodiment of FIG. 1) directing a particular actor to change its state. In some embodiments, processor/memory 1384 generates a control signal based on the received message and transmits the control signal to actuator 1386. The actuator responds to the control signal making the required change in the actor.

Figure 11:
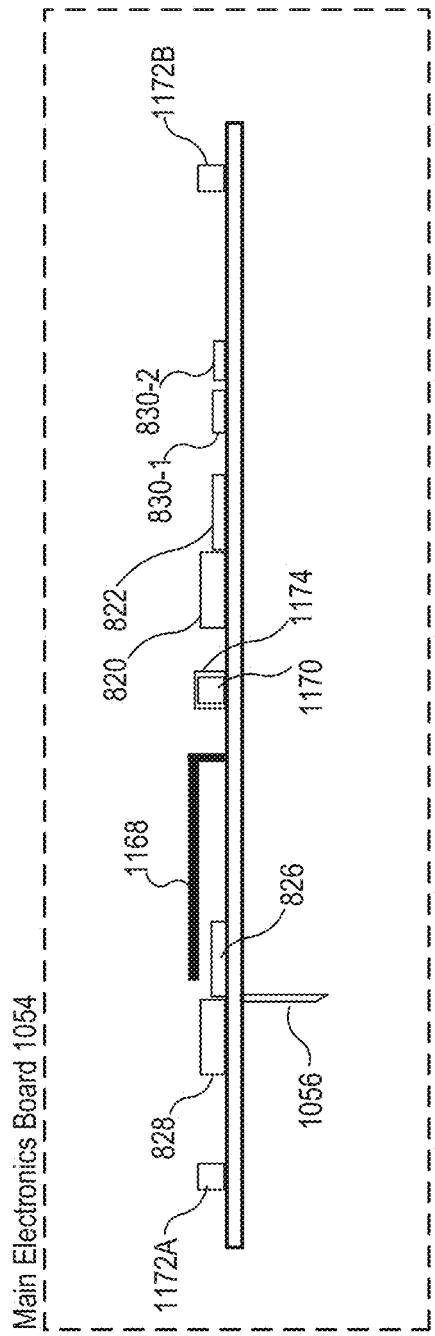
FIG. 11 depicts further detail of the notional component layout the MD of FIG. 10.

FIG. 11 depicts communications components 1382, processor/memory 1384, and actuator 1386 as being operatively coupled to, but distinct from, the actor. However, in some embodiments, some actors incorporate one or more of the aforementioned elements. Various smart bulbs are now available that include WiFi capabilities and a processor running software than can be controlled by a smartphone App. It is expected that increasingly more actors will be made to incorporate such elements for ready integration in automation systems. Furthermore, the communications components 1382 and processor/memory 1384 can be integrated on a single microchip. In the illustrative embodiment, communications components 1382 support wireless telecommunications. In some other embodiments, however, communications components 1382 support wired telecommunications and in still further embodiments, communications components 1382 support both wireless and wired telecommunications.

As those who are skilled in the art will appreciate in light of this disclosure, an actor can be any of a variety of devices, such as a light bulb as part of a lighting system, a media player as part of an audio/video system, a heater as part of an environment control system, an outgoing-email server as part of a messaging system, a controller in a water sprinkler system, a robot or robotic arm, a pan/tilt camera, a switch, a motor, a servo mechanism, and so on. Table I below provides some non-limiting examples of actors and some states/conditions thereof that can altered:

TABLE 1

Actors and Conditions Affected

| Actor | Condition of Actor Being Affected |
| --- | --- |
| Lights | Turn "on" or "off", change color, display a picture or a pattern |
| Stereo System | Turn "on" or "off", increase or decrease volume, change playlist, select signal source |
| HVAC System | Increase or decrease temperature, alter humidity, alter air fragrance |
| Outgoing email server | Generate an alert (email, SMS message, etc.) |
| Security Camera | Pan or tilt |
| Media Player | Select signal source, audio language, subtitles, chapter, play/pause/stop, rewind/fast forward |
| Smart TV | Selecting an application to be launched, navigating on screen menus |
| Window Shades | Raise or lower shades |
| Door Locks | Unlock or lock doors. |

FIG. 2 depicts automation system 200, which comprises monitoring devices ("MD") 202-i, where i is a positive integer from 1 to M and actor devices ("actors") 206-i, where i is a positive integer from 1 to N. In automation system 200, each MD 202-i (hereinafter generically "MD 202") is depicted as being able to communicate with each actor 206-i (hereinafter generically "actors 206"). In some other embodiments, no MD 202 is able to communicate with all actors 206 in automation system 200, and in some further embodiments, some but not all MDs 202 are able to communicate with all actors 206.

The salient distinction between automation system 100 and automation system 200 is that in automation system 200, MDs 202 communicate directly with actors 206 in peer-to-peer fashion rather through an intermediary (i.e., system controller 104).

Automation system 100 is an example of a system with centralized logic (i.e., residing in system controller 104) whereas automation system 200 is an example of a system having distributed logic. More particularly, in automation system 200, the functionality that, in automation system 100, is provided by system controller 104, is distributed among other elements of the automation system, such as to MDs 202, and/or actors 206, and/or other elements associated with the actors, as depicted in FIG. 11.

MDs 202 are configured the same as MDs 102 with the exception that, in some embodiments, some of the functionality of system controller 104 resides with MDs 202. Likewise, actors 206 are configured the same as actors 106 except that, in some embodiments, some of the functionality of system controller 104 of automation system 100 resides with actors 206 (or other components associated therewith, as depicted in FIG. 11).

FIG. 3 depicts automation system 300, which comprises monitoring devices ("MD") 302-i, where i is a positive integer from 1 to M and actor devices ("actors") 306-i, where i is a positive integer from 1 to N. Communication between MDs 302-i (hereinafter generically "MD 302") and actors 306-i (hereinafter generically "actors 306") is enabled via processor 304 accessible over network 308 (e.g., the Internet, etc.).

The salient distinction between automation system 100 and automation system 300 is that in automation system 300, the functionality of system controller 104 in the embodiment of FIG. 1 has been migrated to the "Cloud." In some embodiments, the functionality provided by processor 304 of system 300 is identical to that provided by system controller 104 of system 100. In some other embodiments, the functionality provided by system controller 104 is distributed among processor 304 and at least one of MDs 302 or actors 306 (or associated components as shown in FIG. 13).

Further detail regarding monitoring devices 102/202/302 (hereinafter simply "the MD") is now presented in conjunction with FIGS. 4A-4B, 5A-5B, 6A-6D, 7A-7C, and 8-11.

FIGS. 4A-7C depict four illustrative exterior configurations for the MD. FIGS. 4A and 4B depict respective side-perspective and top views of configuration 410 having a generally hemispherical shape with slightly concave top surface 412 and slightly rounded bottom surface 416. FIGS. 5A and 5B depict respective side-perspective and top views of configuration 510 having a generally cubic shape with slightly concave top surface 512 and a flat bottom surface 516.

FIGS. 6A-6D depict respective side, top, side-edge, and bottom views of configuration 610. Configuration 610 has a truncated ellipsoid form with sides 614 and base region 618. Base 618 has a flat bottom 616 having an elliptical perimeter.

FIGS. 7A-7B depict perspective and top views of configuration 710, respectively. Configuration 710 includes cylindrical central portion 711 and ring-like or annular region 717 that surrounds central portion 711.

As depicted in FIG. 7C, configuration 710 is reconfigurable wherein the orientation of central portion 711 and annular region 717 is changeable with respect to one another by rotating central portion 711, annular region 717, or both such elements about axis E-E (FIG. 7B). In other words, with respect to the orientation depicted in FIGS. 7A and 7B wherein upper surface 712 of central portion 711 and upper surface 719 of annular region 717 are co-planar, the aforementioned movement results in surfaces 712 and 719 being out-of-plane with respect to each other, such as depicted in FIG. 7C.

As discussed in further detail later in this disclosure, movement, as effected by a user, of the MD (or elements thereof) about an axis of rotation, such as axes A-A, B-B, C-C, D-D, for respective configurations 410, 510, 610, 710, and about axes E-E for configuration 710, is sensed by the MD. Such movement is indicative of:

(a) a user's desire to alter a state of an actor by a certain amount; and/or (b) the particular functionality of the MD; and/or (c) to which of plural actors a request/report from the MD is meant to apply.

Information related to such movement is processed by the MD and/or other elements of an automation system (e.g., systems 100, 200, 300, etc.) in accordance with the present teachings.

Figure 8:
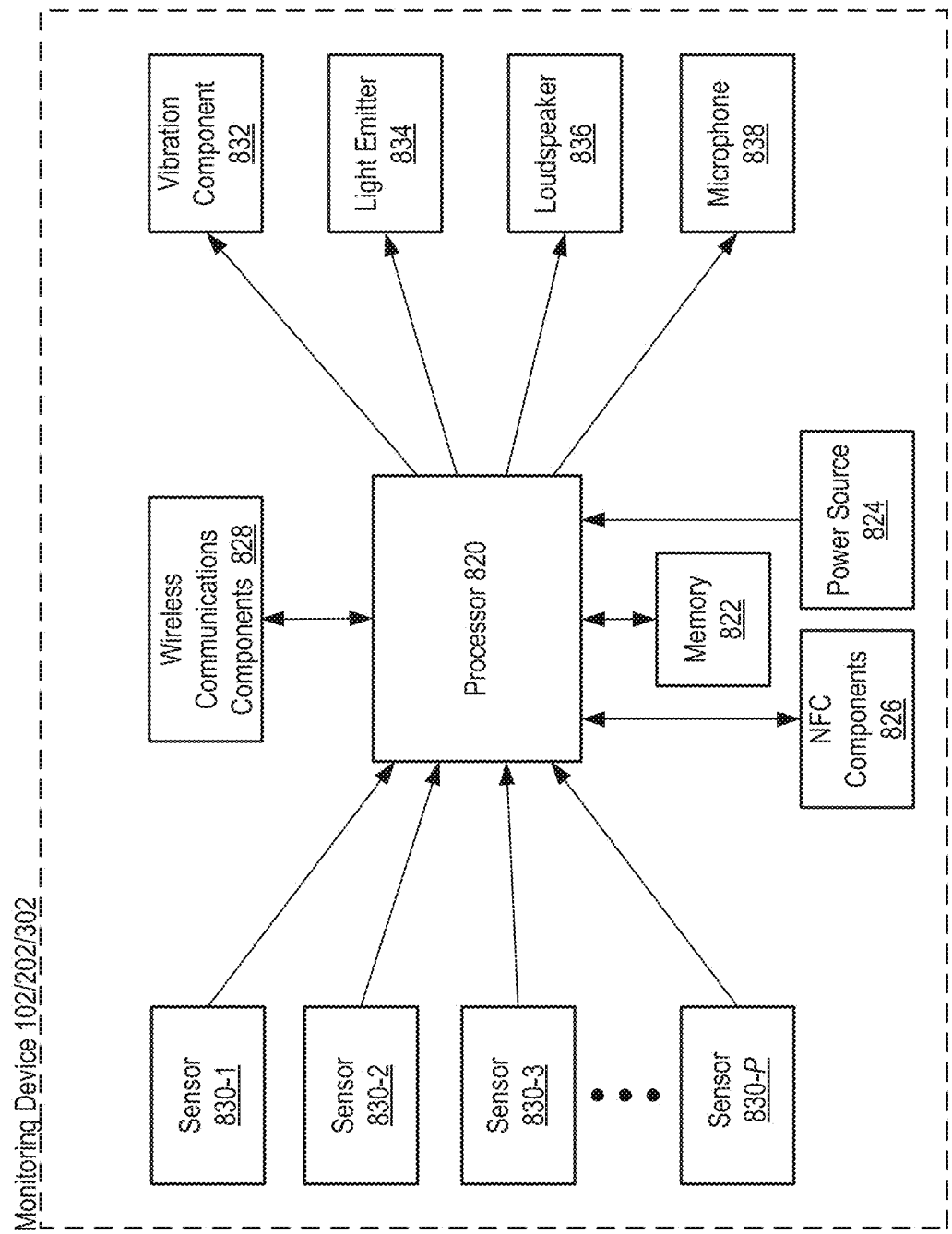
FIG. 8 depicts a block diagram of an MD in accordance with an illustrative embodiment of the present invention.

FIG. 8 depicts a block diagram of the salient elements of an MD in accordance with an illustrative embodiment of the invention.

Referring now to FIG. 8, the MD comprises: processor 820, memory 822, power source 824, near-field communications ("NFC") component 826, wireless communications components 828, sensors 830-i, wherein i is a positive integer from 1 to P (hereinafter collectively sensors 830), vibration component 832, light emitter 834, loudspeaker 836, and microphone 838, interrelated as shown.

The MD is an apparatus that includes the hardware and software necessary to perform the methods and operations described below. For example and without limitation, the MD has one of more of the following capabilities:

an ability to sense its angular rotation and spatial orientation;

an ability to sense its location;

an ability to sense local environmental conditions (e.g., air quality, humidity, temperature, light levels, noise levels, etc.);

an ability to determine time of day;

an ability to sense external motion;

an ability to receive input via sensors 830, microphone 838, wireless communications component 828;

an ability to receive information about conditions prevailing beyond its immediate environs via wireless communications component 828 based on transmissions from remotely-located sensors;

an ability to process information received from sensors 830, microphone 838, wireless communications component 828; and an ability to transmit signals via at least wireless communications component 828, vibration component 832, light emitter 834, and loudspeaker 836.

Sensors 830 gather information about the MD itself (i.e., primary-channel information) and/or the environment that the MD monitors (i.e., secondary-channel information). Each sensor 830-i monitors a particular physical condition in well-known fashion. Each sensor 830-i senses the monitored condition and is capable of generating a signal containing information indicative thereof. Such signals are transmitted to processor 820. A given sensor 830-i can report discrete states and/or a continuum of states of the monitored condition and can report at particular times and/or continuously. For example and without limitation, each sensor 830-i in the MD can be individually selected from the following devices, among others:

i. An active proximity sensor for detecting nearby motion. In some embodiments, the active proximity sensor includes one near-infrared diode and two receivers. Using two receivers enables, among any other benefits, the ability to discriminate the direction of motion (e.g., waving a hand from right-to-left versus left-to-right). The reported state can be, for example, discrete: "motion detected moving left," "motion detected moving right," or "motion not detected".

ii. As an alternative to (i), a passive infrared (PIR) element (e.g., with a Fresnel lens) to detect the motion and/or presence of humans/pets, including software-adjustable sensitivity (e.g., amplifier gain, etc.). The reported state can be, for example, discrete: "motion detected" or "motion not detected".

iii. A temperature sensor to report ambient temperature. The reported state can be, for example, a continuum; that is, a temperature value.

iv. A light (luminescence) sensor to report light level (e.g., ambient level, etc.). The reported state can be a light-level value.

v. A touch sensor, the output of which can be used to wake up and/or trigger other sensors, particularly those with a relatively high-power draw (e.g., accelerometer, gyroscope, etc.). This sensor can report a touch event to trigger various actions when touched. This sensor can also be used as a protection against theft (the system can sound an alarm when the MD is touched or moved). The reported state can be, for example, "contact detected" or "contact not detected".

vi. A gyroscope (e.g., single-axis, multi-axis, etc.) And accelerometer (e.g., single-axis, multi-axis, etc.) to report angular rotation or spatial orientation and other motion-related events (e.g., taps, bumps, etc.).

vii. An air humidity sensor, to control A/C, fans, and so on. For example, the reported state can be, for example, a humidity value.

viii. A carbon dioxide sensor, to control A/C, ventilation, and so on. The reported state can be, for example, a carbon dioxide level value.

ix. A carbon monoxide sensor, for providing a security/safety alarm function. The reported state can be, for example, a carbon monoxide level value.

x. A (natural) gas sensor, for providing a security/safety alarm function. The reported state can be, for example, a gas level value.

xi. A flood (water) sensor, implemented with exposed contact electrodes, for example. The reported state can be, for example, "water detected" or "water not detected".

xii. A radio-beacon receiver. The MD can be moved throughout a monitored environment by a user; accordingly, it can be configured to determine its location (e.g., relative location, absolute location, etc.) by receiving one or more radio location beacons. In some embodiments, the device can detect the proximity of other radio location beacon sources such as smart buttons, key fobs, mobile stations emitting beacon signals, and so on.

xiii. A real-time clock. Among other uses, the clock can be used in conjunction with geo-location information to compute the position of the Sun, making the MD aware of the outside light level (e.g., day versus night, etc.).

xiv. An electronic compass (reporting the static "heading" of the sensor).

Processor 820 is a processing device, such as a microprocessor as is well known in the art. Processor 820 is configured such that, when operating in conjunction with the other components of the MD, it executes software, processes data, and telecommunicates according to the operations described herein.

In addition, processor 820 executes sensor-fusion algorithms, combining the data from two or more sensors for any of a variety of purposes. For example, such sensor-fusion algorithms can be used in order to intelligently wake-up individual elementary sensors and other components as needed, such as those previously in a sleep mode to conserve power. More particularly, for example, in some embodiments in which the MD comprises an accelerometer and gyroscope, the gyroscope is powered only when the MD's touch sensor reports touch activity and the accelerometer is powered all the time. The accelerometer can be used, for example, to report static tilt of window, etc.). In some embodiments, a change in accelerometer reading triggers the gyroscope to power up. As another example, in some embodiments, some or all of wireless communications components 828 are powered up on demand through the use of sensor fusion. Also, the data from two or more sensors can be used to determine the desirability/necessity of requesting a change in state of an actor.

Memory 822 is non-transitory and non-volatile computer storage memory technology that is well known in the art (e.g., flash memory, etc.). Memory 822 stores the processor's operating system, application software, and a database. The application software that is executed by processor 820 enables the MD to perform the functions disclosed herein.

Power source 824 is a battery (e.g., a coin battery, etc.) that provides electrical power to the other components of the MD. In some embodiments, the battery is rechargeable. In some alternative embodiments, the power source is something other than a battery.

Near-field communication (NFC) component 826 enables the MD to telecommunicate with other devices and systems by transmitting signals thereto and/or receiving signals therefrom, in well-known fashion, by using its transmitter portion and receiver portion, respectively.

In particular, NFC component 826 is able to access memory 822, in order to enable the MD to be commissioned and/or configured via an external, active NFC device (e.g., a smartphone, system controller 106, etc.). Near-field communication can also be used as an out-of-band information exchange channel to transport security-related information (e.g., keys, etc.) And/or pairing information.

In some embodiments, an NFC reader/receiver can obtain location information for the MD, such as when the MD is placed on or near an NFC tag. In this fashion, the MD is able to report not only values (e.g. temperature, etc.), but values tagged with a location value (e.g., a location ID, etc.). With a location value, the MD is capable of controlling many actors in either "peer-to-peer" fashion or via system controller 104. For example, when used as a volume control knob, the MD can control a characteristic of an actor/equipment that exhibits a particular location-based characteristic in relation to the MD (e.g., the volume of the closest audio source, the brightness of the closest light bulb, etc.). The location of the MD can also be derived from the radio beacon receiver portion of wireless telecommunications components 828.

It will clear to those skilled in the art, after reading the present disclosure, how to make use and use various embodiments of the present invention in which the MD telecommunicates via physical media (e.g., cable, wire, etc.) to an external device, either in addition to or instead of the wireless capability provided by NFC component 826.

Wireless communications components 828 enable the MD to telecommunicate with other devices and systems by transmitting signals thereto and/or receiving signals therefrom, in well-known fashion, by using its transmitter portion and receiver portion, respectively. In some embodiments, components 828 can directly communicate with compatible equipment (e.g., Bluetooth-enabled light bulbs, etc.), in order to control directly one or more devices. Wireless communications component 828 communicates via one or more radio protocol suites such as, but not limited to, Z-Wave, ZigBee, Bluetooth, WiFi, 6LoWPAN, and so on.

Some or all of wireless communications components 828 are powered up on demand. For example, the transmitter portion of component 828 is powered up when sending periodic "keep-alive" packets and when there are events to be reported, such as, for example, when the temperature changes by more than some threshold amount (the reporting threshold can be set by software and/or control application).

Wireless communications components 828 also provide location-beacon functionality. In doing so, it broadcasts an identifier and transmit-power level, so that devices receiving a signal therefrom can estimate their location based on received signal strength indicator (RSSI) and/or triangulation (whenever signals from more than MD are being received). An example of the location-beacon functionality provided by wireless communications components 828 is disclosed in U.S. patent application Ser. No. 13/770,077, filed on Feb. 19, 2013, which is incorporated herein by reference. In some embodiments, wireless communications components 828 are capable of receiving beacon signals from other MDs and/or other signal sources, so that MD housing the wireless communications components 828 can become aware of its own location.

Vibration component 832 provides a vibration function (e.g., motor, piezo, etc.) for haptic feedback to a user of the MD. The vibration component can be embodied as a motor, a piezo, or other devices familiar to those skilled in the art.

Light emitter 834 signals state (e.g., "on"), functions, and/or feedback to a user of the MD. In accordance with an illustrative embodiment, light emitter 834 is a light-emitting diode (LED). In some embodiments, multicolor LEDs are used. Light emitter 834 is capable of emitting visible and/or infrared light.

Loudspeaker 836 provides information such as audio feedback and/or system announcements, in well-known fashion, to a user of the MD. In some embodiments, loudspeaker 836 is capable of generating ultrasound (i.e., frequencies greater than about 20 kHz).

Microphone 838 captures and relays sounds (e.g., ambient sounds, etc.) to processor 820. The sound, for example, could be used as input to a presence-detection algorithm for determining if a person is in the vicinity of the MD. Also, the microphone can receive voice commands from a user of the MD.

In some embodiments, microphone 838 is capable of receiving ultrasound, such as generated via ultrasound-capable embodiments of loudspeaker 836. Such a microphone comprises a SODAR (Sound Detection And Ranging) sensor, which enables measurement of a distance between the MD and other objects (e.g., a hand, etc.) for touchless gesture sensing. That is, with knowledge of what particular gestures are used to indicate a desired action, a user can perform a gesture for sensing by the MD. Sensors capture aspects of the gesture and the data is processed via the automation system (e.g., in the MD and/or system controller 104, etc.). A request to effect the desired state change is then generated and transmitted. Also, gesture-based control can be implemented with the MD in hand, using an on-board gyroscope and accelerometer.

The MD communicates in both directions of the radio interface, so it can receive control commands as well as transmit. Any or all functions executed by the MD can be enabled, disabled, and/or adjusted via a software interface (e.g., with system controller 104 or a mobile device app, and via wireless communications component 828). Functions at the MD can be selectively disabled, for example, to conserve energy and maximize battery life. The MD's software is field-upgradeable via over-the-air update (OTAU), so new functions and fixes can be distributed to each MD. Each MD has a unique ID/address, so that receiving software (e.g., in system controller 104, etc.) can identify the source of data.

Figure 9:
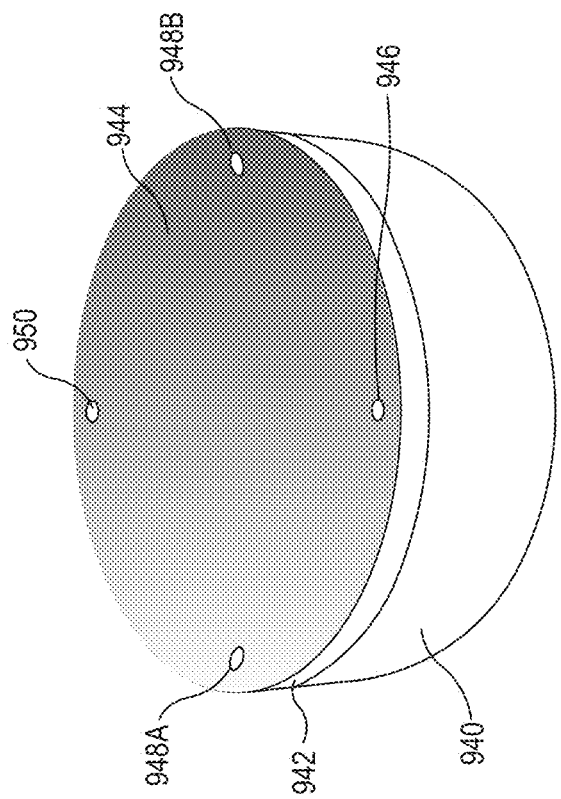
FIG. 9 depicts further external detail of an embodiment of an MD having the form factor depicted in FIGS. 4A-4B.

FIG. 9 depicts a notional external layout for the MD represented via block diagram in FIG. 8. The layout is shown for an MD having a generally hemispherical shape, like configuration 410 shown in FIGS. 4A and 4B.

The MD includes a housing or body 940 and cap 942. In some embodiments, body is anodized aluminum and cap 942 is plastic. In the illustrative embodiment depicted in FIG. 9, cap 942 has top surface 944, which includes windows 946, 948A, 948B, and 950. Windows 946, 948A, and 948B are used in conjunction with an active proximity sensor system. In some embodiments, the proximity sensor system includes two near-infrared LEDs and one IR receiver. The IR receive is disposed beneath window 946 and the two near-infrared LEDs are disposed below each window 948A and 948B. The activity proximity sensor system is described in further detail in conjunction with FIG. 11. An RGB indicator light is disposed below window 950.

Figure 10:
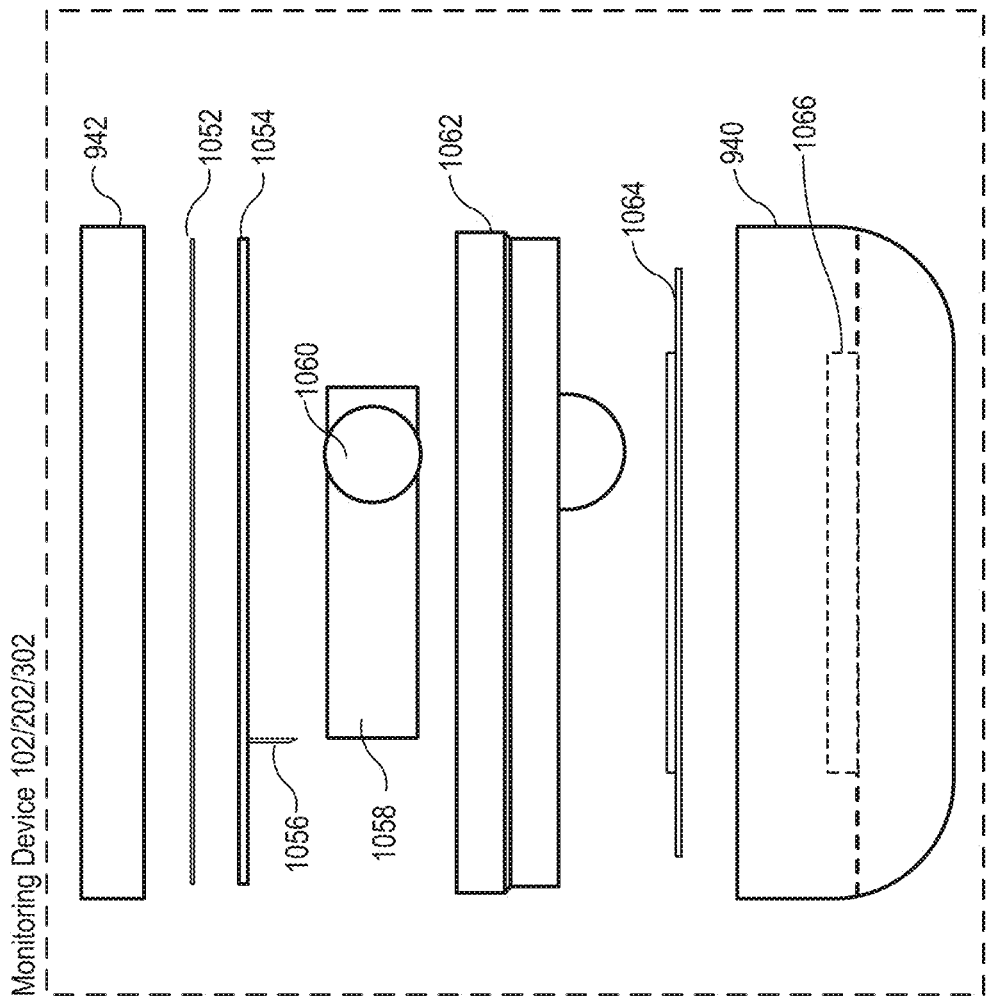
FIG. 10 depicts a notional component layout of an MD in accordance with an illustrative embodiment of the present invention.

FIG. 10 depicts an "exploded" view of an embodiment of a notional component layout for the MD depicted in FIGS. 8 and 9.

Disposed within body 940 and cap 942 are capacitive touch film 1052, main electronics board 1054, battery 1058, vibration motor 1060, main internal compartment 1062, magnet cover 1064, and magnet 1066. Internal compartment 1062 is dimensioned and arranged to receive battery 1058, vibration motor 1060, board 1054, and capacitive touch film 1052.

In some embodiments, internal compartment 1062 is attached to cap 942, such as via ultrasonic welding. Battery 1058 powers vibration motor 1060 and the various electronic components (see FIG. 11) on main electronics board 1054. The vibration motor, which is an implementation of vibration component 832 (FIG. 8) can be used to provide feedback to a user, such as to indicate that a command has been acknowledged, etc. Power is delivered to board 1054 via electrical contact 1056.

Capacitive touch film 1052 renders top surface 944 of cap 942 "touch sensitive." Film 1052 is typically a flexible polycarbonate film or sheet having an electrically conductive grid pattern imposed thereon. When energized, the grid projects a very low amperage EM field through most non-metallic materials, such as the plastic. In the case of the MD, the field is projected through top surface 944 of cap 942. When a user's finger/hand comes into contact with top surface 944, it creates a change in the field and capacitance. This change is recognized as "touch".

Magnet 1066 is used to couple the MD to, for example, a base/wall plate comprising a magnetic metal (e.g., iron, nickel, etc.), such as depicted in FIGS. 14A-B, 15A-B, and 16A-B, discussed later in this specification. In some embodiments, the MD further or alternatively comprises an enclosure with several interchangeable mount options (not depicted), such as a suction cup, a "gecko-type" sticky surface, double-sided sticky tape, hook-and-loop fastener (i.e., VELCRO®), and so on, in order to provide freedom of placement.

FIG. 11 depicts additional detail of PCB 1054. Processor 820, memory 822, NFC components 826, wireless communications components 828, including antenna 1168, and most of sensors 830 within the MD (see, e.g., FIG. 8) are disposed on main electronics board 1054.

FIG. 11 depicts three sensors: sensor 830-1, which is a gyroscope, sensor 830-2, which is an accelerometer, and an IR sensor, which includes IR receiver 1170 and near-IR LEDs 1172A and 1172B. As previously discussed, the gyroscope and accelerometer are used primarily to determine angular rotation or spatial orientation and other motion-related events (e.g., taps, bumps, etc.).

The IR sensor is used as an active proximity sensor. IR receiver 1170 is disposed below window 946, near-IR LED 1172A is disposed below window 948A, and near-IR LED 1172B is disposed below window 948B in top surface 944 of cap 942 of the MD. In operation, the LEDs are rapidly pulsed. To the extent that there is something in front of the MD, IR receiver 1170 receives IR reflected therefrom. Because there are two LEDs 1172A and 1172B situated as shown, if there is motion in front of the MD, such as a wave of a user's hand, the direction of the motion can be determined in known fashion. This enables the MD to capture user gestures, which, with appropriate software and processing, can be interpreted as commands (e.g., turn off the lights, close the drapes, turn of the television, etc.).

In some embodiments, a motion sensor can be implemented via as a passive infrared sensor ("PIR") rather than using an active IR sensor. In such embodiments, the sensor includes a Fresnel lens or a special focusing mirror, as is known to the those skilled in the art. PIR sensing materials requires materials that pass far-IR wavelengths, such as germanium and polyurethane. The former material is expensive and the latter is very soft, both of which characteristics are disadvantageous in a product such as the MD.

Main electronics board 1054 also includes RGB LED 1174, which is an implementation of light emitter 834 (FIG. 8). LED 1174 is disposed beneath window 950 in top surface 944 of cap 942 of the MD. LED 1174 is used, in some embodiments, to signal various conditions. For example, in some embodiments, LED 1174 can illuminate when the proximity sensor is activated, change color when the MD is rotated, etc.

In some other embodiments, the MD incorporates one or more additional sensors, such as an ambient light sensor, a humidity sensor, and/or a gas sensor. To the extent that the MD includes sensors that require atmospheric sampling, the MD must include openings that permit air to enter the MD so as to reach the sensors. In embodiments in which the MD has a real time clock and is programmed with geolocation coordinates, it is able to compute the current position of the Sun over (or under) the horizon (i.e., an "astronomical" clock), so the MD can determine whether it is "day" or "night" and act accordingly (e.g., report status or transmit commands based such knowledge or applications thereof, etc.).

In some embodiments, each MD has a machine-readable identification code or mark (e.g., one-dimensional code, barcode, two-dimensional code, data matrix code, QR-code, NFC tag, etc.) to facilitate automated commissioning, as described in the following example. System controller 104 with several MDs and actors 106 (e.g., light bulb, wall plug, smart socket, etc.) can be packaged as a product kit. During the packaging process, the IDs of the MDs are read, without the need to power up the MDs, and stored as a dataset describing the particular kit. When unpacked in preparation for commissioning, the system controller retrieves the kit dataset via the Internet (based on its own ID) and automatically recognizes the MDs from the kit. In some other embodiments, the dataset is introduced to system controller 104 on the packaging line without the need to retrieve it from the Internet, such as, for example, by writing it to a configuration memory by the NFC interface. These commissioning techniques are generally applicable to all product kits comprising some elements that are capable of radio communications.

FIGS. 14A and 14B depict respective perspective and exploded side views of an embodiment of a base plate for use with an MD. The base plate can be attached to a wall or simply rest on a surface. Base plate 1488 comprises top case 1489, insert 1494, magnet 1497, and mounting plate 1498, arranged as depicted.

Top case 1489 has sidewall 1490 and upper surface 1491. Opening 1493 is located centrally in upper surface 1491. Region 1492 of upper surface 1491 rises toward opening 1493. In some embodiments, top case 1489 is aluminum, although other materials suitable for this application (e.g., relatively inexpensive, scratch resistant, non-deformable, light, etc.) can alternatively be used.

Insert 1494 is dimensioned to fit within top case 1494. Receiving region 1496 on insert 1494, which in the illustrate embodiment has a cupped (i.e., concave) form, extends upward so that marginal region 1495 of insert 1494 is substantially flush with the perimeter of opening 1493. Receiving region 1496 is sized and shaped to receive an MD, such as an MD as depicted in FIG. 4A/4B/9A/9B or 7A-7C. In some embodiments, insert 1494 comprises plastic. Among any other benefits, using plastic, in particular for receiving region 1496, prevents scratches from forming on the MD when it is disposed in receiving region 1496 and rotated (e.g., to control an actor, etc.).

Magnet 1497 is disposed below insert 1494. Magnet 1497, in conjunction with magnet 1066 (FIG. 10) in the MD, ensure that the magnetic force attracting the MD and base plate 1488 to one another will be sufficient to ensure that the MD remains magnetically coupled to the base plate, even when the base plate is oriented vertically, such as when it is attached to a wall. Mounting plate 1498 is disposed below magnet 1497 and serves to mount base plate 1488 to a surface. In some embodiments, mounting plate 1498 includes holes (not depicted) to facilitate driving screws, etc., into a wall or other supporting surface. In some other embodiments, the bottom surface of mounting plate 1498 includes a layer of adhesive so that the base plate can be bonded to the wall.

It will be apparent based on the foregoing disclosure that the MD, either by itself or operating in conjunction with the system controller, can provide "context-based" control. That is, the MD is capable of doing more than sensing and reporting a user-requested change in the state of an actor, based on the user interaction with the MD. Non-limiting illustrative examples of context-based control in accordance with the present teachings are provided below.

Consider an MD having configuration 510 and including an accelerometer and a gyroscope. The MD will report (to either the system controller or the actor) if it is rotated when the MD is resting on a surface (e.g., a table, etc.) with: (1) a first surface of the MD abutting the surface ["orientation-1"]; (2) a second surface of the MD abutting the surface ["orientation-2"]; or (3) a third surface of the MD abutting the surface ["orientation-3"]. The rotation occurs about an axis that is orthogonal to the abutting surface of the MD; that is, if the surface is horizontal, the axis of rotation is vertical. See FIG. 5A, axis B-B. Rotation of the MD when it is in orientation-1 controls light intensity of one or more lamps, rotation of the MD while in orientation-2 controls the loudness of an audio system, and rotation of the device while in orientation-3 controls the color of light from the one or more lamps. Thus, the contextual information that indicates the change in functionality of the MD is which particular surface of the MD is in contact with a support surface. The change in functionality can be implemented by the system controller or by the MD itself.

In some embodiments of the invention, in addition to one or more MDs, the system includes a plurality of base plates. As previously disclosed, the MD is capable of recognizing the base plate on which it resides or is nearest to. In this example, the "context" for MD operation is provided by the base plate upon which the MD resides.

In some embodiments, the MD also includes at least one sensor for sensing a condition unrelated to the MD itself, such as environmental conditions (e.g., temperature, heat, light, sound, humidity, carbon monoxide level, carbon dioxide level, smoke, etc.), motion detection, time of day, etc.). Such sensors are referred to herein as "passive" sensors. The following examples of context-based control utilize information from one or more passive sensors.

In some embodiments, the MD includes a real-time clock. The MD can be operated so that during daytime hours it controls sun shades and during nighttime hours it control lights. Here, time is the "context" for the MD's operation.

The data from a light sensor in the MD can be used to control lighting. Since the actor (i.e., lighting) associated with the MD directly affects the monitored state (ambient light level), a feedback arrangement can be established. That is, the ambient light level is obtained by the passive sensor in the MD and reported to the system controller. The system controller compares the reported light level to a set-point representative of a desired illumination level. To the extent there is an offset between the reported light level and the set-point, the system controller generates a control signal that attempts to null the offset. The control signal is transmitted to an actuator associated with the lighting system to cause the illumination to change as required. In this embodiment, ambient light level is the context for the MD's operation.

Data from a sensor in the MD that measures ambient sound can be used to control the lighting. This is an example of an embodiment wherein there is no direct relation between the monitored state (ambient sound level) and the actor (lighting) being controlled. However, the presence or absence of sound can be indicative of the presence or absence of a person near to the MD. It might be desirable to have the lights on when a person is in the room and desirable to have them off when no one is in the room (i.e., to conserve power). When sound is detected, the MD can report its own location and the sound detection to the system controller, which, under the circumstances, is programmed to turn-on lights that are in the vicinity of the MD. Alternatively, the MD can be arranged so that when sound is detected, it transmits a "turn-on" signal either (1) directly to the lights or (2) to the system controller. In this embodiment, sound is the context for control.

In some embodiments, data from a sensor in an actor is transmitted to an MD, which in turn, transmits that external sensor information (either by itself or with additional information acquired by the MD) to the system controller. In some other embodiments, the data from the actor's sensor is transmitted directly to the system controller.

Figure 15:
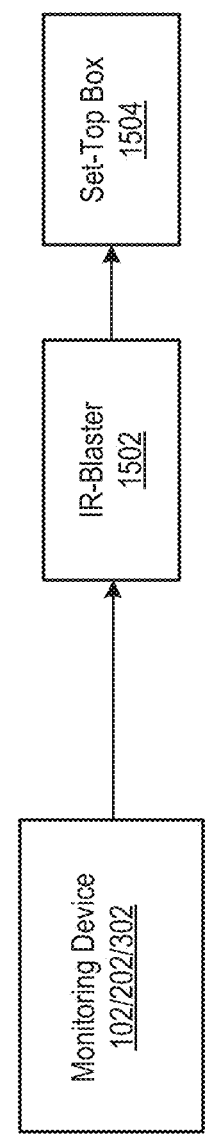
FIG. 15 depicts an MD communicating directly with an IR blaster that is associated with a set-top box.

FIG. 15 depicts an embodiment wherein wireless communications components 828 of an MD communicate directly with an infrared (IR) "blaster" 1502, which is another example of an "actor." An IR blaster is an IR emitter attached by wire directly to a controlled device (e.g., audio/video receiver, TV set-top box, air conditioner, etc). The blaster can receive radio signals, such as from wireless communications components 828 of the MD and emit IR signals that control the equipment behind it, such as set-top box 1504. In other words, system commands are sent via an MD's radio to the IR blaster, which relays them as IR commands to the controlled equipment. In some alternative embodiments, IR-blaster circuitry (IR-emitting diodes) is embedded in the MD.

Operational Examples. As previously noted, the MD can be used as a control knob. That is, in some embodiments, turning the MD clockwise or counterclockwise about a predefined "first" axis of rotation (regardless of the MD's orientation in space) provides an indication of the amount/degree of desired change in the state of an actor (i.e., primary-channel information). In some embodiments, this functionality is implemented by a gyroscope and an accelerometer (see, e.g., FIG. 11: sensors 830-1 and 830-2, respectively). These sensors can also be used to alert of a malfunction, such as when a MD falls off of a wall-mounted base plate.

In the illustrative embodiments depicted in FIGS. 4A, 5A, 6A, and 7A, the first axis of rotation is axis A-A, B-B, C-C, D-D, respectively. A symmetry axis is typically, although not necessarily, selected as the first axis. As a consequence, for configurations that have a single symmetry axis, the symmetry axis is typically chosen as the first axis of rotation. Configurations 410, 510, and 610 possess a single symmetry axis and that axis is chosen, in the illustrative embodiments, as the first axis of rotation. Configuration 710 has two axes of symmetry, D-D and E-E. In the embodiment depicted in FIGS. 7A-7C, axis D-D is selected to be the first axis of rotation. As a consequence, rotation of the MD about axis D-D provides an indication of the amount/degree of desired change in the state of the actor.

It has been previously disclosed that in some embodiments, positional/rotational information obtained by the MD is interpreted to assign MD functionality and/or the targeted actor to which a request/report from the MD is meant to apply. This processing can be performed in either the MD, system controller 104, or in the Cloud. Furthermore, the interpretation of the information received from a given MD can be based on:

(i) other input the processor receives (e.g., from a user, other actors, other MDs, non-MD-based sensors, etc.); or (ii) a pre-defined assignment (e.g., by a user during commissioning, etc.), which is stored in memory of system controller 104, the MDs, or in the Cloud.

Rotating an MD about a symmetry axis thereof in the manner of a rotary knob, as discussed above, is naturally/intuitively associated with increasing or decreasing a value (e.g., increasing light intensity, etc.). As a consequence, for dictating MD functionality or identifying a targeted actor, a different axis of rotation—a "second" axis—is selected.

In configuration 710 depicted in FIG. 7C, the "second" axis is axis E-E. The rotation being tracked for configuration 710 is the relative rotation of central portion 711 and annular region 717 with respect to one another. For example, when the MD is in the orientation (state) depicted in FIGS. 7A and 7B wherein upper surface 712 of central portion 711 and upper surface 719 of annular region 717 are co-planar, the MD is assigned a first functionality, such as a light dimmer. However, when rotation about second axis E-E results in surfaces 712 and 719 being out-of-plane with respect to each other, such as depicted in FIG. 7C, the MD is assigned a second functionality, such as controlling a motorized shade.

It is notable that the assigned functionality can apply to primary-channel input or secondary channel (passive) input. In other words, rotation about second axis E-E can dictate the significance of movement of the MD (primary-channel information) about the first axis D-D. Alternatively, rotation about second axis E-E can be used to activate certain sensors that monitor the MD's ambient environment (secondary channel information), wherein the MD reports information from the activated sensor to, for example, system controller 104 or an actor 106.

In the embodiment discussed above, rotation about the "second" axis was illustrated for configuration of an MD having two portions that move with respect to one another (i.e., configuration 710). However, such a configuration is not necessary to assign functionality or identify a targeted actor.

Consider, for example, an MD having configuration 410 depicted in FIGS. 4A and 4B. In a first orientation depicted in FIG. 4A, the major surfaces of the MD are horizontal (like a coin lying flat on a table). In a second orientation, the MD is "on-edge," wherein the major surfaces of the MD are oriented vertically (like a coin standing on its edge). In some embodiments, the association and/or functionality of the MD is indicated by these two aforementioned orientations. For example, in the first orientation, the MD is assumed to function as a dimmer for a light bulb and in the second orientation to function as a loudness control for a television.

Several illustrative but non-limiting examples of a home automation system in accordance with the present teachings are now presented. To the extent a particular actor is identified as being part of the home automation system, it is to be understood, as previously indicated, that the actor includes or is otherwise associated with the required instrumentation, etc., to respond to requests/commands from the MD or system controller.

First Example. A home automation system includes plural recessed overhead "smart" light bulbs, each of which transmits a radio beacon (all transmitting at the same power level) and actuation software and hardware suitable for responding to a request to increase or decrease the intensity of the light emitted from the bulb. The home automation system also includes a system controller and an MD, the latter capable of determining its rotation (as effected by a user) about a first axis, wherein such rotation relates to the amount by which the intensity of light from the bulb is to be increased or decreased. Rotation is determined using a gyroscope and accelerometer. The MD is also capable of measuring signal strength of the radio beacons to determine which of the plurality of overhead lights is nearest. Each beacon includes the address of its source, so that once the MD identifies the nearest smart bulb, it is capable of transmitting a message thereto, the message being a request for the bulb to change state (i.e., increase or decrease light intensity). In this example, only primary-source information—the rotation and location of the MD—is being used to control the smart bulb.

Second Example. A home automation system includes a system controller, an MD, a lamp with a "smart" light bulb as discussed above, and a smart television.

The MD includes a gyroscope and accelerometer and has configuration 410 depicted in FIGS. 4A and 4B. In a first orientation, the major surfaces of the MD are horizontal (like a coin lying flat on a table). In a second orientation, the MD is "on-edge," wherein the major surfaces of the MD are oriented vertically (like a coin standing on its edge). The association and/or functionality of the MD is indicated by the aforementioned orientations. In the first orientation, the system controller designates the MD to function as a dimmer for the light bulb and in the second orientation to function as a loudness control for the television.

Once the MD is in either of these two orientations, rotation of the MD about a first axis, as reported via signal(s) from the MD, indicates the amount/degree of desired change in state of the actor. For example, in some embodiments, the first axis is orthogonal to the major surfaces of the MD. Thus, when the MD is in the first orientation, the axis extends vertically through the center of the MD (e.g., axis A-A in FIG. 4A). When the MD is in the second orientation, the axis extends horizontally through the center of the MD. Like the first example, in this example, only primary-source information—the orientation and rotation of the MD—is being used to control the actors.

Third Example. A home automation system includes a system controller, an MD, and a plurality of overhead recessed "smart" light bulbs, as discussed above. A first sensor in the MD is capable of monitoring ambient light level. The MD is resting on a surface (e.g., table, desk, floor, etc.). The first sensor obtains a reading of ambient light level, which is reported (transmitted) to the system controller. The system controller determines, that, based on the reported reading, light intensity should be increased. This determination can be made by comparing the reading to data in a look-up table that provides, for example, desired light output as a function of the time of day. The system controller transmits a message to the smart bulbs to increase output by a specified amount. In this example, only secondary-channel information is used to control the actors.

Fourth Example. A home automation system includes a system controller, an MD, and a plurality of actors, including overhead recessed "smart" light bulbs, motorized shades, and a smart HVAC system. A first sensor in the MD is capable of monitoring ambient light level, a second sensor in the MD is capable of monitoring temperature, and a third sensor in the MD is capable of monitoring motion. The system controller is also capable of receiving readings from a weather station associated with a smart underground sprinkler system for watering the lawn.

The MD obtains readings from the first, second, and third sensors at a particular time, as triggered by the system controller, in a first room in the home. The MD reports the readings to the system controller: no motion is detected, a temperature of 27° C., and a particular ambient light level. The system compares the measured temperature to a set point temperature, which in this example is 25° C. The temperature must therefore be lowered by 2° C. In this example, the system controller runs an algorithm that considers several parameters to achieve a desired temperature: the amount of cooling/heating provided by the HVAC system, the amount of heating that occurs as a consequence of lights being on, and the effect on room temperature caused by the room's window shades being up or down (thereby bringing more or less light into the room).

The system controller accesses, from memory, information concerning whether the room lights are on or off (based on past actions by the system) and determines that the lights are on. The system controller infers that no one is present in the room based on the motion sensor reading and verifies that the lighting is not currently being controlled by other considerations (e.g., timed to turn "on" while occupants are away based on security concerns, etc.). The system controller transmits a message to the smart bulbs to turn off and directs the MD to obtain another ambient light reading. The ambient light measurement indicates that the light level in the room is relatively high, as determined by comparison to reference data stored in the system controller's memory. The system controller determines that the shades should be closed to reduce the amount of sunlight entering the room. At this point, the system controller does not adjust the operation of the HVAC system. The MD continues to obtain temperature readings and report to the system controller. The system controller continues monitoring temperature, noting any decrease and, assuming that the temperature starts to fall, takes no action until the temperature stabilizes. If the temperature stabilizes above the set point, the system controller would then adjust the HVAC system as required to further reduce temperature. This systematic approach would improve energy efficiency.

Fifth Example. A home automation system includes an MD, first and second base plates attached to a wall, overhead recessed "smart" light bulbs, and a home entertainment system. The MD includes both a gyroscope and an accelerometer and has configuration 610 depicted in FIGS. 6A through 6D.

The MD is capable of magnetically coupling to the base plates via magnets disposed in the MD (see FIG. 9: items 944). When the MD is coupled to the first base plate, it functions as a "dimmer" control for the lights. When the MD is coupled to the second base plate, it functions as a volume control for the home entertainment system. Additionally, the base plates are capable of charging the battery of the MD when the MD is coupled thereto.

When rotated clockwise about first axis C-C (see FIG. 6A), the MD increases light intensity or entertainment system volume as a function of the base plate to which it is coupled. When rotated counter-clockwise about first axis C-C, the MD decreases light intensity or entertainment system volume as a function of the base plate to which it is coupled.

In this embodiment, the request/report from the MD is transmitted directly to the actor; that is, either the smart bulbs or the entertainment system.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A building automation system comprising:
 a first monitoring device having a housing comprising a body and a cap, wherein the cap comprises a plurality of windows, at least some of which windows are infrared transparent, and wherein the housing contains:
 (a) a first sensor of a first group of sensors, wherein the first group of sensors include sensors that monitor a state of the first monitoring device and provide first data representative thereof;
 (b) a second sensor of a second group of sensors, wherein the second group of sensors includes sensors that monitor a state of the first monitoring device's ambient environment and provide second data representative thereof;
 (c) a processor that generates a first message based on at least one of the first data and the second data;
 (d) a transmitter that transmits the first message; and
 (e) an active infrared (IR) sensor, wherein the active IR sensor comprises a first near-IR light-emitting diode (LED) and a first receiver for detecting near-IR, and further wherein:
 (i) the first near-IR LED is positioned in the housing and with respect to the cap so that near-IR radiation emitted therefrom escapes from a first window of the plurality thereof, and
 (ii) the first receiver is positioned in the housing and with respect to the cap so that near-IR radiation entering the housing through a second window of the plurality thereof is received by the first receiver.

2. The system of claim 1 wherein the state of the first monitoring device is an angular rotation thereof.

3. The system of claim 1 wherein the state of the first monitoring device is the spatial orientation thereof.

4. The system of claim 1 wherein the state of the first monitoring device is the location thereof.

5. The system of claim 1 wherein the first message is based on both the first data and the second data.

6. The system of claim 1 further comprising a first actor.

7. The system of claim 6 wherein the first message is transmitted to the first actor.

8. The system of claim 6 further comprising a system controller, wherein the system controller generates and transmits to the first actor a request for the first actor to change state, wherein the request is based on at least one of following:
 (a) the first message transmitted by the first monitoring device;
 (b) information pertaining to the building automation system that is stored in memory accessible to the system controller;
 (c) information transmitted by and received from a second monitoring device; and
 (d) information received from the first actor.

9. The system of claim 6 wherein the actor receives a request to change state of the first monitoring device indicates an amount of a desired change in state of the first actor.

10. The system of claim 6 wherein the state of the first monitoring device dictates the manner in which the first monitoring device functions with respect to the first actor.

11. The system of claim 6 further comprising a second actor, wherein the state of the first monitoring device dictates with which of the first actor or second actor the first monitoring device associates.

12. The system of claim 6 wherein the second data does not relate to a physical condition that can be affected by a change in state of the first actor.

13. The system of claim 6 and further comprising:
a second monitoring device; and
a system controller, wherein the system controller receives the first message generated by the first monitoring device and a second message that is generated by the second monitoring device, and further wherein the system controller:
(a) determines that a change in state in the first actor is warranted based on the information contained in the first and second messages;
(b) generates a third message that requests the first actor to change its states;
(c) transmits the third message to the first actor.

14. The system of claim 1 wherein the cap comprises a non-magnetic material.

15. The system of claim 14 wherein the first monitoring device further comprises a capacitive touch film, wherein the capacitive touch film is disposed in the housing proximal to the cap.

16. The system of claim 1 wherein the active IR sensor further comprises a second near-IR LED for emitting near-IR band radiation, wherein the second near IR LED is positioned in the housing and with respect to the cap so that near-IR radiation emitted therefrom escapes from a third window of the plurality thereof.

17. The system of claim 1 wherein the first monitoring device further comprises a magnet, wherein the magnet is disposed in the housing.

18. The system of claim 17 further comprising a base plate, wherein the base plate comprises a magnet and a receiving region, wherein the receiving region is dimensioned to receive the housing of the first monitoring device.

19. The system of claim 1 wherein the housing comprises openings for admitting gas from the ambient environment, and wherein the second group of sensors includes at least one of a humidity sensor and a gas sensor.

20. The system of claim 1 wherein the first near-IR LED is pulsed in operation.

21. The system of claim 1 wherein the first group of sensors includes a gyroscope and an accelerometer.

22. The system of claim 21 wherein the second group of sensors further includes a real-time clock.

23. The system of claim 1 wherein the second group of sensors includes a motion sensor, a temperature sensor, a light sensor, and a touch sensor.

24. A building automation system comprising:
(1) a plurality of monitoring devices, including a first monitoring device comprising a housing comprising a body and a cap, wherein the cap comprises a plurality of windows, at least some of which windows are infrared transparent, and wherein the housing contains:
(a) a first sensor of a first group of sensors, wherein the first group of sensors include sensors that monitor a state of the first monitoring device and provide first data representative thereof,
(b) a second sensor of a second group of sensors, wherein the second group of sensors includes sensors that monitor a state of the first monitoring device's ambient environment and provide second data representative thereof,
(c) a processor that generates a first message based on at least one of the first data and the second data,
(d) a transmitter that transmits the first message, and
(e) an active infrared (IR) sensor, wherein the active IR sensor comprises a first near-IR light-emitting diode (LED) and a first receiver for detecting near-IR, and further wherein:
 (i) the first near-IR LED is positioned in the housing and with respect to the cap so that near-IR radiation emitted therefrom escapes from a first window of the plurality thereof, and
 (ii) the first receiver is positioned in the housing and with respect to the cap so that near-IR radiation entering the housing through a second window of the plurality thereof is received by the first receiver;
wherein each monitoring device in the plurality of monitoring devices is capable of:
 (aa) monitoring its own state, wherein the monitored state is at least one of the monitoring device's angular rotation, orientation in space, or location,
 (bb) monitoring a state of the monitoring device's ambient environment,
 (cc) generating a first message pertaining to the results of (aa) and (bb), and
 (dd) transmitting the first message;
(2) a central controller, wherein the central controller receives the first message and generates a second message based thereon, wherein the second message comprises a request for a first actor to change a state thereof; and
(3) the first actor, wherein the first actor receives the second message and complies with the request.

25. A system comprising:
a first monitoring device having:
(a) a first group of sensors including an accelerometer and a gyroscope, wherein the first group of sensors include sensors that monitor a state of the first monitoring device and provide first data representative thereof, wherein the state of the first monitoring device is angular rotation thereof;
(b) at least a second sensor of a second group of sensors, wherein the second group of sensors includes sensors that monitor a state of the first monitoring device's ambient environment and provide second data representative thereof;
(c) a processor that generates a first message based on at least one of the first data and the second data; and
(d) a transmitter that transmits the first message;
wherein the first message represents if the first monitoring device is rotated when in contact with a support surface, and is based on whether (i) a first surface of the first monitoring device abuts the support surface, as in a first orientation, or (ii) a second surface of the first monitoring device abuts the support surface, as in a second orientation, wherein rotation and orientation are determined by the accelerometer and the gyroscope; and
wherein the first message is for representing (i) a first functionality while the first monitoring device is in the first orientation and (ii) a second functionality while the first monitoring device is in the second orientation.

26. The system of claim 25 wherein the first functionality is control of light intensity of one or more lamps.

27. The system of claim 25 wherein the second functionality is control of loudness of an audio system.

28. The system of claim 25 wherein the first message is further based on whether (iii) a third surface of the first monitoring device abuts the support surface, as in a third orientation, and wherein the first message is for representing a third functionality while the first monitoring device is in the third orientation.

29. The system of claim 28 wherein the third functionality is control of the color of light from one or more lamps.

* * * * *